Figure 1:
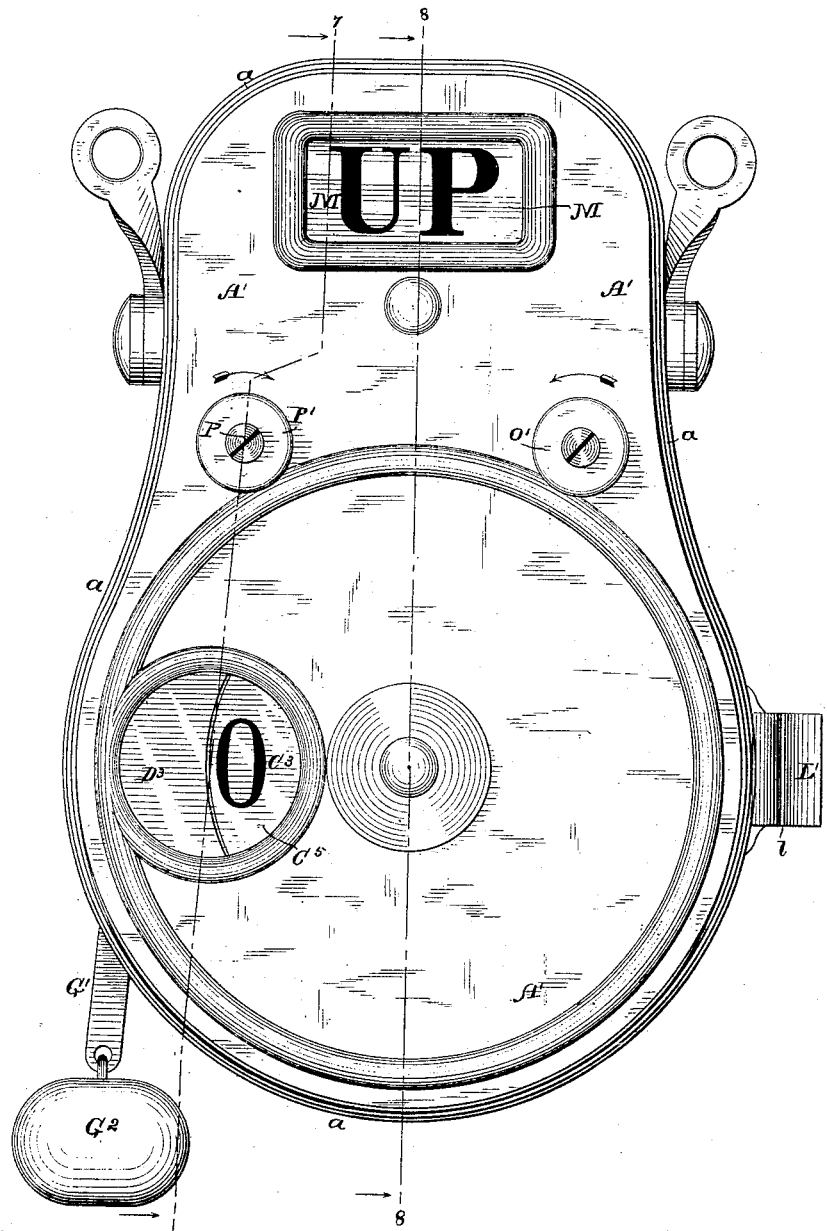

(No Model.) 7 Sheets—Sheet 1.

J. B. BENTON.
FARE REGISTERING MACHINE.

No. 332,866. Patented Dec. 22, 1885.

WITNESSES
Wm A. Skinkle
Geo. W. Young

INVENTOR
John B. Benton
By his Attorneys
Baldwin, Hopkins & Peyton.

(No Model.) 7 Sheets—Sheet 2.
J. B. BENTON.
FARE REGISTERING MACHINE.

No. 332,866. Patented Dec. 22, 1885.

WITNESSES
Wm A. Skinkle
Geo. W. Young

INVENTOR
John B. Benton,
By his Attorneys
Baldwin, Hopkins & Peyton.

(No Model.)
7 Sheets—Sheet 3.

J. B. BENTON.
FARE REGISTERING MACHINE.

No. 332,866.  Patented Dec. 22, 1885.

WITNESSES
Wm A. Skinkle
Geo. W. Young

INVENTOR
John B. Benton
By his Attorneys
Baldwin, Hopkins & Peyton

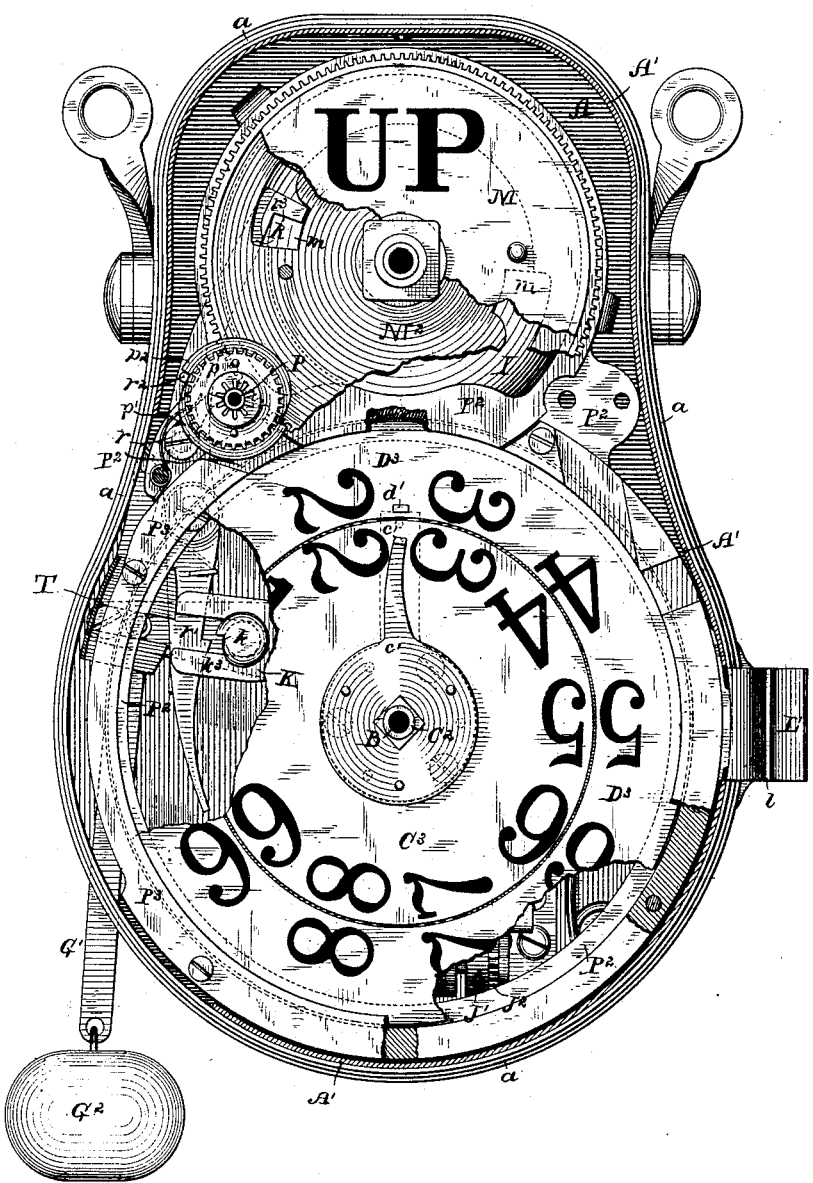

(No Model.) 7 Sheets—Sheet 5.
J. B. BENTON.
FARE REGISTERING MACHINE.

No. 332,866. Patented Dec. 22, 1885.

WITNESSES
Wm A. Skinkle
Geo. W. Young

INVENTOR
John B. Benton,
By his Attorneys
Baldwin, Hopkins & Peyton (No Model.) 7 Sheets—Sheet 6.

J. B. BENTON.
FARE REGISTERING MACHINE.

No. 332,866. Patented Dec. 22, 1885.

WITNESSES
Wm A. Skinkle
Geo W. Young

INVENTOR
John B. Benton,
By his Attorneys
Baldwin, Hopkins & Peyton.

(No Model.)  7 Sheets—Sheet 7.

J. B. BENTON.
FARE REGISTERING MACHINE.

No. 332,866.  Patented Dec. 22, 1885.

WITNESSES
Wm A. Skinkle
Geo. W. Young

INVENTOR
John B. Benton
By his Attorneys
Baldwin, Hopkins & Peyton

United States Patent Office.

JOHN B. BENTON, OF NEW YORK, ASSIGNOR TO THE RAILWAY REGISTER MANUFACTURING COMPANY, OF BUFFALO, N. Y.

FARE-REGISTERING MACHINE.

SPECIFICATION forming part of Letters Patent No. 332,866, dated December 22, 1885.

Application filed November 11, 1884. Serial No. 147,608. (No model.)

*To all whom it may concern:*

Be it known that I, JOHN B. BENTON, of the city, county, and State of New York, have invented certain new and useful Improvements in Registering-Machines, of which the following is a specification.

My invention relates more particularly to the class of registering-machines especially adapted for fare-registering purposes, and more particularly to the type of fare-registers known as "duplex" machines.

My improvements are more especially designed as improvements on prior registers patented to me and to my assignee, The Railway Register Manufacturing Company, of Buffalo, New York.

My present machine embodies the construction of a general register, a trip-register, a "zero-register," or a register of trips, a direction-indicator, and an eye-signal, which is rendered visible at every actuation of the machine in the counting process.

My machine also embodies a zero gathering-plate, by which, preferably, the figures on the trip-disks are obscured during the resetting of the trip-register to zero, and there is also in the machine a punch operated concurrently or simultaneously with the registering mechanism, in order to punch a trip-slip or ticket, as the case may be.

The machine also embodies an alarm, which is struck once for every fare recorded.

The general object of my present invention is to provide an improved fare-register, to the end that cheating or pilfering on the part of the conductor or collector of the fares may be in a great measure, if not totally, prevented, and by which, if cheating or pilfering is attempted, his exposure and detection are insured.

The objects of my invention more particularly are, first, to provide mechanism which prevents resetting of the trip-register and shifting of the direction-indicator if the machine has been but partially actuated in the counting process, and which will prevent the operation of the actuator or prime mover of the machine after the resetting of the trip-register and shifting of the indicator have been commenced, and until a complete resetting operation and shifting movement have been effected, whereby complete counting operations are necessary, while a complete shifting movement of the indicator and resetting of the trip-register to zero are necessitated when once commenced; second, to provide simple and effective mechanism whereby the trip-register is limited to its exact and proper movement, and is prevented by any sudden movement or too forcible actuation of the machine from being carried farther than it should go; third, to provide a friction device for one or both of the trip-register dials, whereby any excessive movement of the actuator of the machine is prevented from acting injuriously upon the dials, which movement might otherwise tend to destroy their connection with their actuating-wheels or carrying devices; and, fourth, to improve the details of construction and organization of the parts of the register in various respects, as will hereinafter be particularly set forth.

The subject-matter claimed herein as of my invention, consisting of certain new combinations and organizations of devices, is particularly pointed out at the close of the specification.

I wish it to be distinctly understood that some of my present improvements, separately claimed herein, may be used without the others, and in machines differing from that particularly shown in the accompanying drawings and described herein, and as well in machines for fare-registering as for other registering purposes.

In the accompanying drawings I have shown all my present improvements as embodied and organized in one machine in the best way now known to me.

Figure 5:
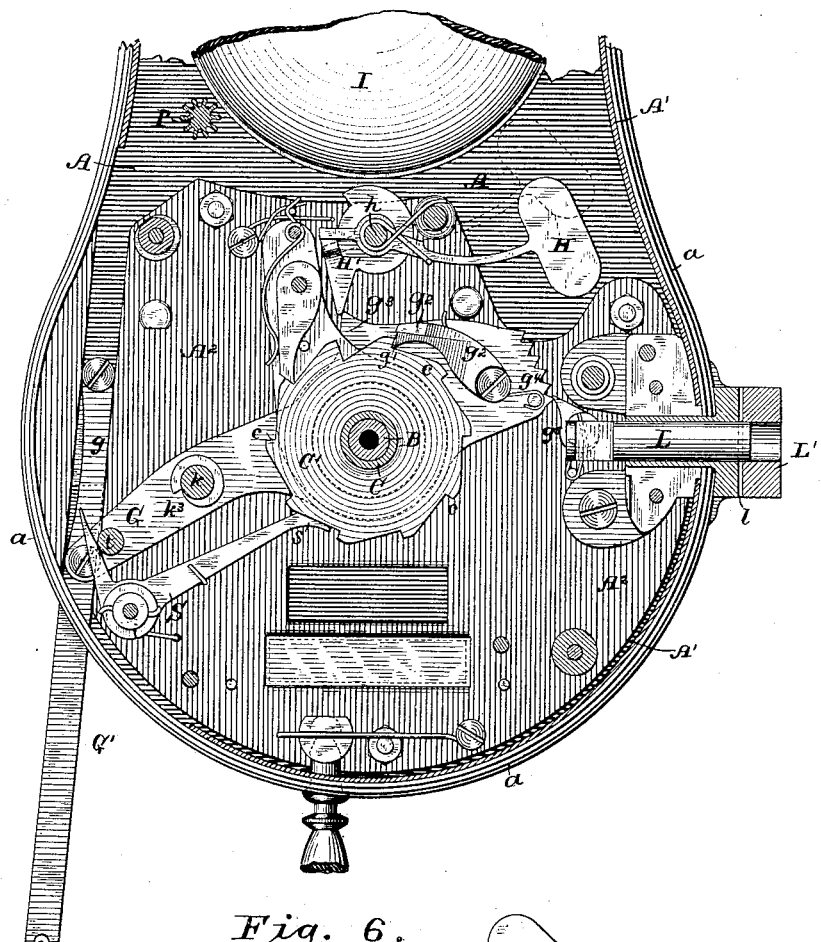
Figure 6:
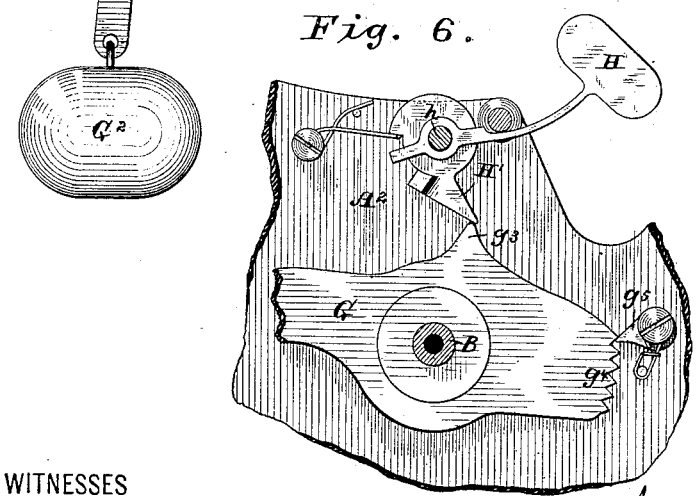
Figure 4:
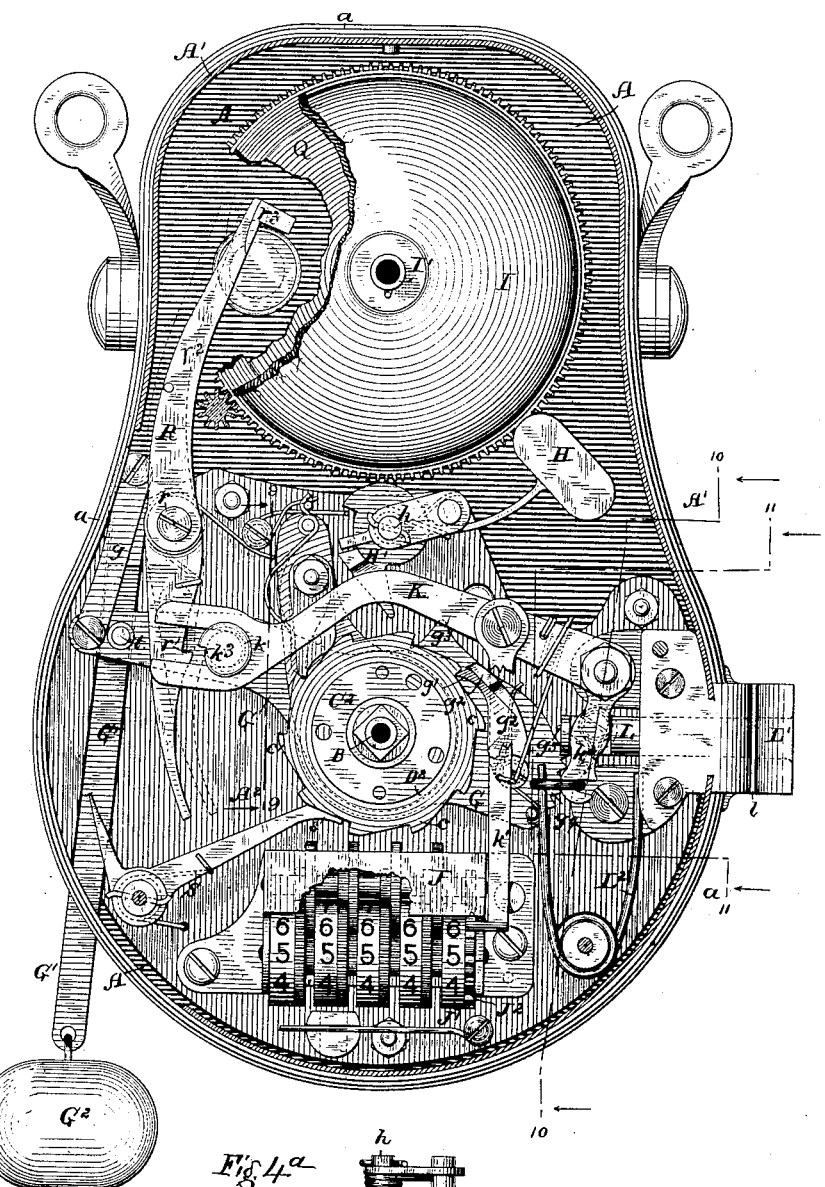
Figure 2:
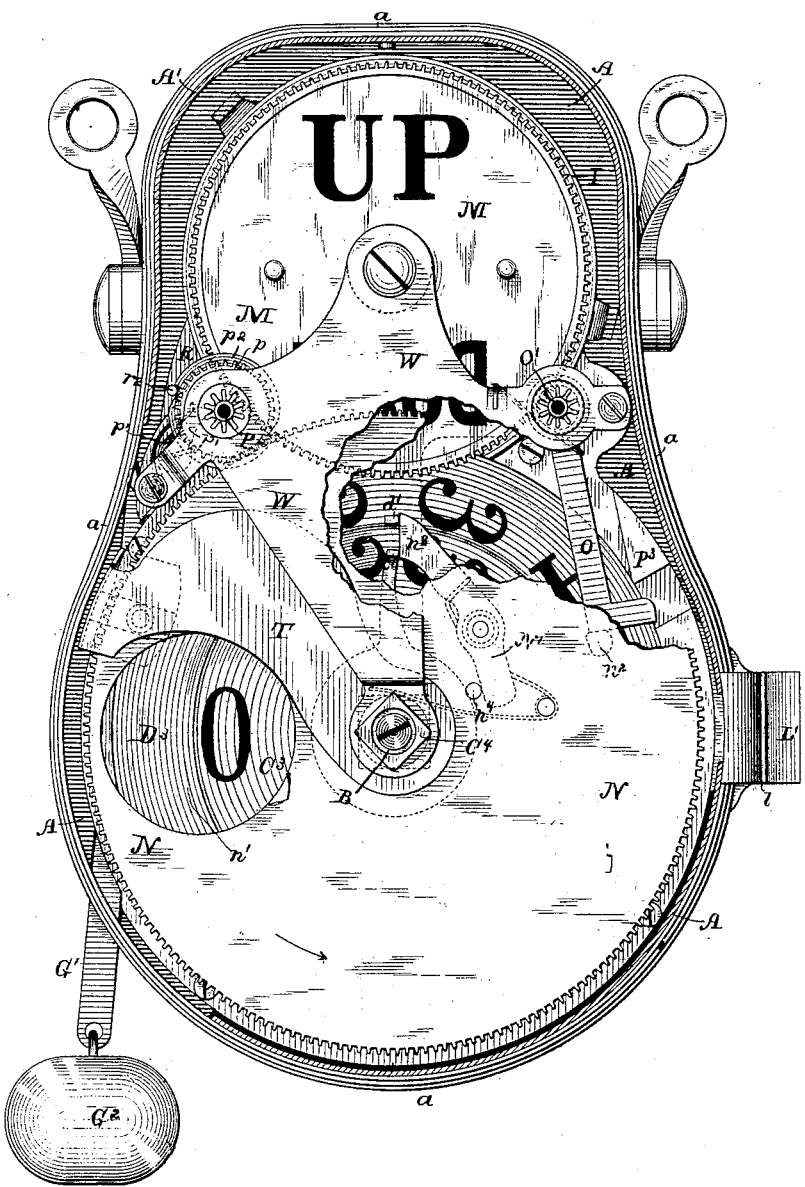
Figure 7:
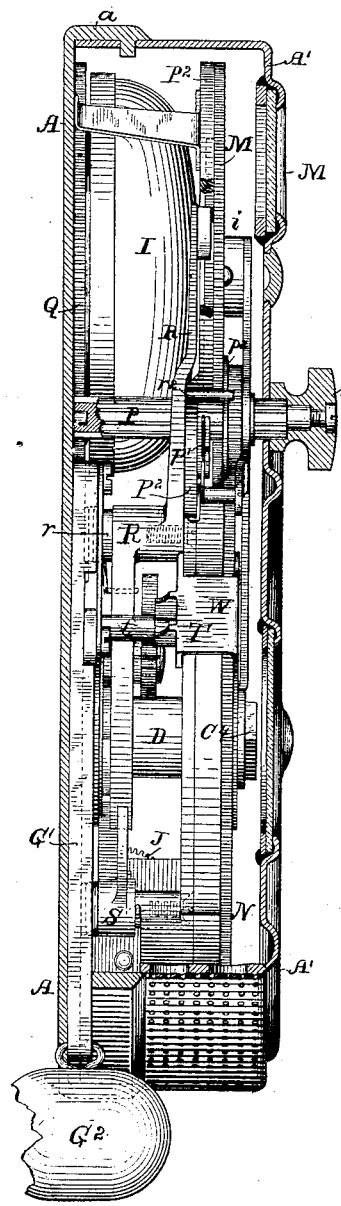
Figure 8:
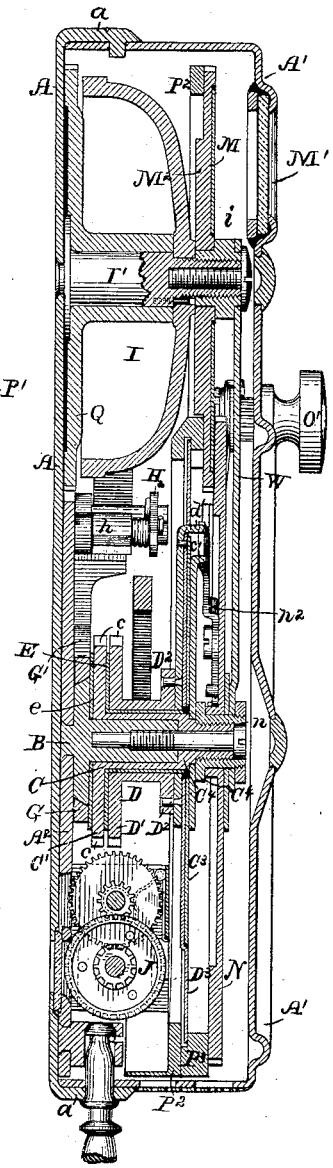
Figure 9:
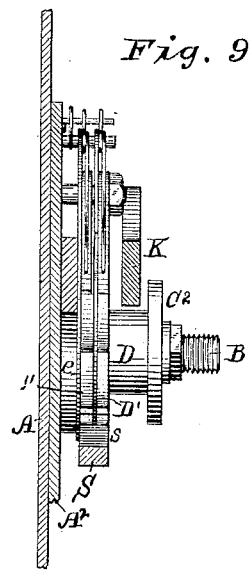
Figures 10, 11:
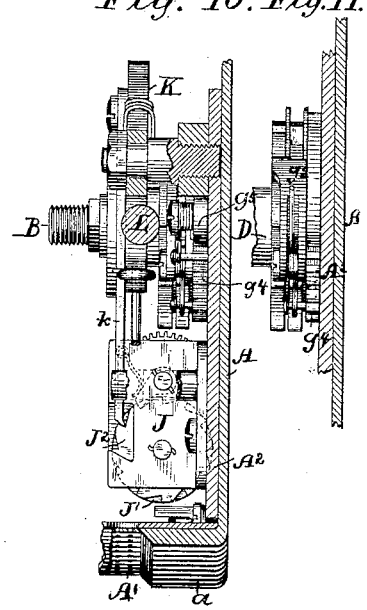
Figure 12:
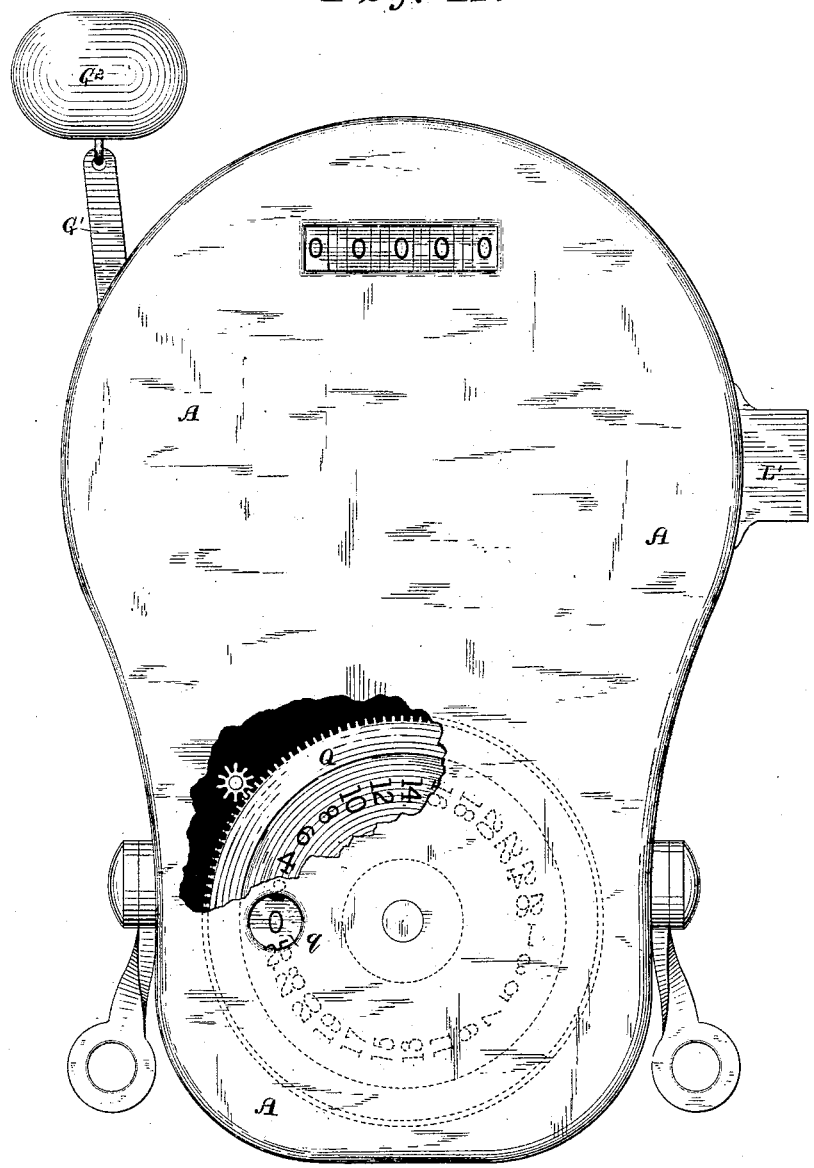

In said drawings, Figure 1 is a front or face view of the machine. Fig. 2 is a similar view with the face-plate of the casing removed and some of the internal parts broken away to show the parts behind them. Fig. 3 is a similar view with still other parts removed and broken away to show those behind them. Fig. 4 is a similar view with still other parts removed and broken away, and Fig. 4ª is a view looking from below of the alarm-hammer and trip-cam therefor. Fig. 5 is a similar view to Fig. 4 of the parts next the base or back plate of the machine. Fig. 6 is a view of the bell-hammer and a portion of the actuating devices. Fig. 7 is a section through the casing of the machine on the line 7 7 of Fig. 1, showing an edge view of the internal parts of the register, looking in the direction indicated by arrow 7 on said Fig. 1. Fig. 8 is a vertical central section through the machine on the line 8 8 of Fig. 1. Fig. 9 is a section through a part of the machine, on the line 9 9 of Fig. 4, looking in the direction of arrow 9 on said figure. Fig. 10 is a section through a portion of the machine, on the line 10 10 of Fig. 4, looking in the direction of the arrow 10 on said figure. Fig. 11 is a section on the line 11 11 of said Fig. 4, looking in the direction of the arrow 11 of said figure; and Fig. 12 is a rear view of the machine inverted, with a portion of the casing broken away to show more particularly the zero or trip register of the machine, the indications of which are exposed through the back of the casing of the machine as well as those of the general register in this instance.

The casing of the machine preferably consists of a back plate, A, having an upturned edge or flange, $a$, and of a face-plate, A', constructed, preferably, in one piece with the sides and ends of the casing, which sides and ends fit within the upturned edge $a$ or flange of the back plate, and are united thereto by screws or other fastenings, in order to form the inclosing-casing within which the operative parts of the mechanism are mounted. The casing in the present instance has curvilinear sides with a substantially flat face and back, while the lower part or center of the casing swells outward or is somewhat larger than the upper part, in order to accommodate the mechanism as organized in the present instance. Projecting forward from the back plate, or a separable plate, A², fastened thereto, so as to constitute virtually part of the back plate, is a preferably central post, B, around which the carrying or supporting devices of the trip-register turn in the operation of the machine.

The carrying or supporting devices of the trip-register consist of two sleeves, C D. The units carrying or supporting sleeve C is provided at its rear end with an actuating ratchet-wheel, C', and with a square front end, C², upon which is fitted the units-disk C³, which has a square opening to enable it to be fitted upon the front end of the carrying-sleeve C, so as to be locked to and turn with said sleeve, the said units-disk C³ being firmly united to its carrying or supporting sleeve by means of a clamp-nut, C⁴, working on the screw-threaded front end of said sleeve. Behind the units-disk C³ is mounted the tens-disk D³, which is united to the front end, D², of the sleeve D, the rear end of which sleeve carries an actuating ratchet-wheel, D', the teeth of which correspond in number to the teeth of the ratchet-wheel C' of the carrying or supporting sleeve C. A suitable stationary washer-plate, E, is interposed between the carrying or supporting sleeves of the two trip-disks, so as to prevent the movement of one affecting the movement of the other. The teeth upon the actuating ratchet-wheels C' D' are preferably ten in number, while one of the notches $c$ of the ratchet-wheel C' is somewhat deeper than the rest.

Behind the actuating ratchet-wheels C' D' of the trip-register a pawl-carrying lever, G, is mounted, (preferably lying crosswise of the machine,) being fitted to turn about the rear enlarged end or hub of the fixed post B as a fulcrum. The long end of this lever G is connected by a link, $g$, with a straight reciprocating or endwise-movable handle, prime mover, or slide, G', fitted to slide in a guide in the back plate of the machine, or to move endwise through the casing at one side thereof, and the lower end of which extends outside the machine, through a guide-slot in the bottom of the casing, and is fitted with a knob or operating device, G², so as to be capable of being readily actuated by a downward pull, to operate the machine. Said lever G is fitted at its short end with a double pawl, $g'$ $g^2$, the two pawls being preferably formed together, but one being arranged with its point in front of the other, whereby when the pawl-carrying lever is vibrated by the endwise-movable slide or actuator G' of the machine its point $g'$ will engage one of the teeth of the ratchet-wheel C' of the units-disk of the trip register and move said units-wheel one point, while the pawl $g^2$ is held out of engagement with the ratchet-wheel D' of the tens-disk. At the tenth actuation of said pawl $g'$ it will enter the deep notch $c$ of said ratchet-wheel C', and permit the point of the pawl $g^2$ to engage a tooth of the tens-disk and turn it one point, whereby if the trip-register has been started at zero said register will indicate 10 at its window C⁵ in the face-plate of the casing, said window being provided, as usual, for the conspicuous exhibition of the count or tally of the trip-register. The units-disk C³ of the trip-register is smaller than the tens-disk, so that a portion of each disk of the trip-register appears opposite the window in the casing.

The units-disk of the trip-register is provided on its face, near its edge, with figures 1 to 0, inclusive, arranged around its edge at equal distances apart, while the tens-disk is also provided with the figures 1 to 9, inclusive, a blank space being left between the figures 1 and 9, as usual, whereby, as is customary, the trip-register is capable of registering or showing a tally of ninety-nine fares, which is more than sufficient for the number of passengers taken on any one half-trip of a car or vehicle.

The pawl-carrying lever G is provided with an actuating projection or point, $g^3$, to operate the bell-hammer and sound an alarm for each actuation of the trip-register. The arm of the bell-hammer H is pivoted upon a suitable post, $h$, projecting from the back plate of the casing, and is acted upon by a spring to throw or hold it against the bell, it being retracted against the force of its spring, and then tripped or released to sound the alarm by means, preferably, of a rocking cam-piece, H', upon which the projection or device $g^3$ of the pawl-carrying lever acts in a well-known way. Of course the bell-hammer may be operated in any other suitable way, if desired. The bell I is mounted upon a post, I', projecting from the back plate of the casing, as usual, it being retained on the post by means of a screw-nut, $i$, working on the screw-threaded front end of said post. The bell I, which, with the hammer H, constitutes the alarm mechanism, is preferably mounted in the upper end of the casing above the trip-register actuating or carrying devices, as shown.

The general register J consists of a series of numbered wheels of well-known construction, geared together, and preferably mounted at the lower end of the casing below the trip-register actuating or carrying devices, and said register is capable of registering consecutively a large number of fares, it being incapable of the resetting movement given to the trip-register, and is designed to register the fares in the aggregate which may be collected and registered on a large number of trips or half-trips of the car or vehicle upon which the machine is used. The units-wheel J' of the general register is provided with an actuating ratchet or toothed wheel, $J^2$, having ten teeth, and said wheel is operated one point simultaneously with every actuation of the trip-register.

The particular construction of the general register constitutes no part of my invention.

The operating connection between the general register and the main actuating-slide or prime mover G' of the machine in this instance is a pivoted lever, K, having a preferably forked free end engaging a post, $k$, on the pawl-carrying lever G, so as to be pivoted or jointed thereto, and thus have a jointed or free connection with the slide or prime mover G'. The levers G and K are therefore jointed to the slide or prime mover G', and constitute a crosswise lever-connection with said prime mover, and carry the operating connections to actuate the trip and general registers and the alarm mechanism. This lever K carries a push pawl or arm, $k'$, preferably pivoted to the lever K, and acted on by a spring to keep it in position, and said pawl or push arm at every vibration of the lever, due to the operation of the slide or prime mover of the machine, operates the units-wheel of the general register one point through its ratchet-wheel $J^2$. This lever K is also provided with a bent or angle end, $k^2$, and the lever is preferably pivoted at its angle to the back plate at one side of the machine, and extends transversely across it above the trip and general registers, and the push-arm $k'$ is also preferably connected to its operating-lever to the right of the center of the machine, as shown, or near the pivot of said lever. There results from the particular arrangement above described a very effective organization of parts and operating connections, and especially so in connection with the endwise-movable slide or prime mover at the left-hand side of the machine, adapted to be operated by a downward pull thereon at the bottom of the casing. The lever K has a loose connection with a punch-die, L, which reciprocates across a slot, $l$, in a punch or ticket-head, L', at the side of the machine. The slot $l$ of the ticket-head L' receives the ticket or strip to be punched or canceled, and at every actuation of the prime mover or actuator of the machine the punch-die is forced across said slot concurrently with the operation of the trip and general registers and of the alarm. A strong spring, $L^2$, acts upon the short or bent end of said angular lever K to return it to its normal position, thereby retracting the punch-die, and in addition returning the main actuator slide to its inward position, and the pawl-carrying lever to its position to engage its operating-pawl with the ratchet-wheel of the trip-register, and the actuating pawl or push arm of the general register into engagement with a new tooth of the actuating ratchet-wheel of the general register in readiness for another actuation of the machine, which is to add to the count or tally. The actuating-point $g^3$ of the pawl-carrying lever is also returned to a position to be again in readiness to raise and trip the bell-hammer through its rocking cam H', before described.

Suitable pawls are provided to prevent back rotation of the trip-register wheels, as well as of the general register, which is common.

I prefer to interpose a suitable washer, $e$, between the trip-register-carrying devices and the pawl-carrying lever G, to prevent any operation or misplacement by frictional contact between the two.

A direction-indicator, or "up-and-down," M, as it is commonly called, is fitted upon the front end of the bell-post I' by means, preferably, of the same screw-nut, $i$, which holds the bell in place upon said post, around an annular portion of which nut the direction-indicator may be turned or shifted in the operation of the machine. This indicator has at opposite points the words "Up" and "Down," as usual, and is provided on its edge with gear-teeth to mesh with a shifting-pinion or gear-shaft, to be presently explained. The indications of the direction-indicator, or up-and-down, are exposed through a window, M', near the upper end of the face-plate of the casing, so as to be observable by those in the car or vehicle, as usual. A zero gathering-plate, N, is mounted so as to turn around an axis formed by the sleeve of the screw-nut $C^4$ on the end of the post B. Said zero gathering-plate, therefore, lies in front of the trip-disks, and it is provided with an opening, $n'$, therein, through which one figure on each of said disks is exposed, to enable them to be seen through the window of the casing when said gathering-plate is in its normal position, as maintained by a zero-stop, O, consisting of a pivoted lever or arm acted on by a spring, so as to be normally maintained in the path of a lug, $n^2$, on the back of said zero-gathering plate. When said gathering-plate is turned so as to bring said lug $n^2$ in contact with the end of the zero stop-lever O, the opening $n'$ in said gathering-plate coincides with the opening or window $C^5$ in the casing through which the indications of the trip-register are exposed. Said gathering-plate is also provided upon its rear face with a pivoted arm, N', the square or abrupt end $n^3$ of which is fitted to engage with projections $c'$ $d'$ on the face of the trip-disks $C^3$ $D^3$ when said zero gathering-plate is turned in a forward direction, as indicated by the arrow in Fig. 2, said gathering-plate being incapable of a backward movement, as will be presently explained. When said gathering-plate is turned, therefore, it acts upon the projections $c'$ $d'$ on the trip-disks, and carries said disks with it in its movement until its lug $n^2$ comes in contact with the zero-stop O, and this is at the time when the zero of the trip-register disk is opposite the window of the face-plate and the opening in the gathering-plate coincides with said window. The arm N' of the zero gathering-plate N is a pivoted arm, and is acted upon by a spring, which permits it to yield so as to offer no obstruction to the forward movements of the trip-disk in the counting operation; but when the gathering-plate is turned the end of said pivoted arm engages the projections of the trip-disks and is rigid, owing to the stop-pin $n^4$, carried by the plate N, against which pin the short end of the arm N' rests, as shown in Fig. 2, whereby there is a positive carrying connection between the zero gathering-plate and said trip-disks in the resetting operation, and the trip-disks are thus carried positively to and stopped at zero in the resetting operation. Said zero gathering-plate N is provided on its edge with gear-teeth, which mesh with a pinion-wheel, $p$, on the gear-shaft P, which shaft likewise meshes by pinion-teeth with the gear-teeth of the direction-indicator, before explained. This pinion-shaft P has bearings at its rear end in the back plate of the casing, and at its front end in the front plate thereof, and intermediately in a skeleton supporting-plate, $P^2$, which aids in supporting and guiding the operating parts of the mechanism. This pinion-shaft is permitted to be turned in one direction only—to wit, in a direction to the right in this example—inasmuch as a pawl, $p'$, engages with its teeth to prevent a reverse movement.

Mounted so as to turn around the bell-post I' is the zero-register or trip-registering wheel Q, having figures on its rear face, which are exposed one at a time through an opening, $q$, in the back plate of the casing as the wheel is revolved. This zero-register wheel has gear-teeth in its edge, which also mesh with the inner end of the pinion-shaft P, above described. Said pinion-shaft is the medium by which the trip-register is reset, the direction-indicator shifted, and the zero-register operated to record the number of times the trip-register is reset. The front end of said shaft projects beyond the front face of the casing, and is provided with a knob, P', by which it is actuated.

It is intended that at the end of each half-trip of the car or vehicle the conductor or other officer of the road shall reset the trip-register to zero and shift the indicator, so as to indicate a new direction of travel, and this organization of a trip-register, in connection with an "up or down," or direction-indicator, has been found very valuable in preventing fraudulent manipulation of the machine and loss to the road by the pilfering or stealings of the conductor. The indication of the direction-indicator being visible, as well as the indication or tally of the trip-register, it is shown at a glance on what direction of travel the fares for the trip are being taken, and thus the conductor is compelled at the end of the trip to reset his trip-register (which is necessary to prevent fraud) and shift his indicator, as otherwise the irregularity is exposed on the reverse trip, because the conductor will be registering for "up," for instance, when he should be registering for "down." This combination, broadly, of indicator and trip-register is not of my first invention, however, but has been improved in its organization by me. It has been found necessary to compel the conductor to shift the indicator when the register is reset, and vice versa, and also when this resetting and shifting operation is being effected to lock the prime mover of the machine so as to prevent any operation or tampering with the machine in that direction. I have provided simple and effective mechanism by which this is done, the commencement of the shifting and resetting movement immediately locking the prime mover from an actuating operation, and this locking condition exists until the complete shifting and resetting movement has been effected; and, in addition, the mechanism is so organized that the shifting and resetting movement of the indicator and trip-register cannot be effected if a partial actuation of the machine has been effected, whereby I enforce a complete resetting and shifting movement while locking the main actuator, and prevent the shifting and resetting movement unless complete operation of the main actuator has been effected in the last counting operation. This prevents any undue manipulation of the machine, as it compels the complete operation in all respects, and does not afford an opportunity of avoiding a locking connection with the main actuator when the trip-register and direction-indicator are being reset and shifted. To this end the direction-indicator plate is provided with a wheel or annular enlargement, $M^2$, at its back, and the edge of this wheel $M^2$ at opposite points is cut away or recessed, as at $mm$, Fig. 3, for the engagement of the upper end of a lever, R, pivoted at $r$ between the supporting-plate $P^2$ and the back plate of the casing. This lever, below its pivot $r$, is provided with a locking-projection, $r'$, which, under certain circumstances, engages in locking contact with a locking-shoulder, $k^3$, of the pin $k$, connecting the lever K with the pawl-carrying lever G. When the direction-indicator is in its normal position, with one of its indications "up" or "down" visible through its window, the upper hooked or locking end, $r^3$, of the lever R lies in one of the recesses $m$, Fig. 3, of the plate rigidly attached to the direction-indicator, and said indicator is therefore locked from a shifting movement, and inasmuch as said indicator is geared with the zero gathering-plate, the shifting mechanism of the trip-register is also locked from a resetting operation.

When, as at the end of a half-trip, a resetting of the trip-register and shifting of the direction-indicator is to be effected, the operation is as follows: The zero stop O is rocked on its pivotal connection by means of a knob, O', out of the path of the lug $n^2$ of the zero gathering-plate N. This knob O' may be securely attached to the shaft of the zero-stop O by means of a pinion-shaped socket fitted over the pinion-shaped end of the shaft of said zero-stop, (see Fig. 2;) but of course the connection of the knob with the zero-stop may be made in any desirable manner. The pinion-shaft P is now turned, and a forward movement of the direction-indicator and of the zero gathering-plate and of the trip-registering wheel is commenced. This turning of the pinion-shaft P by means of a cam, $p^2$, attached to said shaft and acting on a pin, $r^2$, projecting forward from the lever R, cams the upper end of said lever outward and disengages its locking end from the plate $M^2$ of the direction-indicator, and thereby permits a shifting of said indicator, a resetting of the trip-register, and a turning movement of the zero-register or trip-registering wheel Q to be effected, the movement being continued until a complete shifting operation of the indicator and resetting of the trip-register to zero is effected, the movement being stopped when the trip-register arrives at zero by means of the contact of the lug $n^2$ on the zero gathering-plate with the zero-stop O, at which time a new indication is exposed at the window of the direction-plate. When this resetting and shifting movement is commenced and the upper end of the lever R is cammed outward, the lower end of said lever is thrown inward and its locking-projection $r'$ engaged with the locking-shoulder $k^3$ of the pin $k$, connecting or jointing the pawl-carrying lever G and operating lever-arm K, and the actuating-slide G' is firmly locked (owing to the jointed or link connection between said lever G and said slide) from an outward or an actuating movement, and this locking condition continues until a complete resetting of the trip-register and shifting of the indicator has been effected, at which time the opposite recess $m$ of the plate $M^2$ of the direction-indicator comes opposite the upper locking end of the lever, and permits said locking end to be projected into said recess by the action of a spring on said lever, thus automatically locking the parts in that position, and likewise releasing the slide or actuator, which is again free to be operated in the counting process. If it be attempted to partially operate the prime mover or slide G', and then shift the indicator and reset the register, the attempt will be frustrated, because the lever cannot be rocked out of engagement with the notches or recesses of the plate $M^2$ of said indicator, so as to release its locking end therefrom, because its lower end cannot be rocked inward sufficiently for this purpose, as by the downward movement of the main actuating-slide the pin $k$ has been thrown into the path of the lower end of the lever and prevents its rocking movement. Thus the complete operation of the prime mover in the counting process must be effected, and it must be in its proper position when the resetting and shifting operation is commenced, while as soon as said operation is begun the actuator is locked and cannot be moved until the resetting and shifting operation is completed. This prevents any fraudulent manipulation of the machine.

A complete stroke of the main actuator in the counting process is insured, as usual, by means of a detent mechanism, shown in this example as consisting of a ratchet, $g^4$, on the end of the lever G, with a shifting spring-pawl, $g^5$, which is a common device for the purpose, and by which means a partial actuation of the slide and sudden release is prevented and false alarms or striking of the bell avoided.

In the present example I prefer to provide a friction device to exert friction upon the edge of the larger or tens disk $D^3$ of the trip-register, so as to prevent a too free movement due to any sudden or excessive actuation of the machine, which might injure, by being often repeated, the connection between the said disk and its carrying or supporting device. To this end the edge of said disk $D^3$ which lies just in front of the frame-plate $P^2$ is acted upon by a friction-ring, $P^3$, secured to said plate $P^2$, so as to bear lightly upon the edge of the disk. By this means sufficient friction is exerted to overcome excessive movement, and I find it very effectual in preserving the proper connection of the disk with its carrying or supporting devices. A friction device for the smaller or units disk may also be provided, if desired; but it is unnecessary in most instances.

I have also found it desirable to overcome the momentum of the carrying or supporting devices of the units and tens disks of the trip-register, and to limit their movement, in order to prevent them from being thrown too far upon an excessive or forcible actuation of the machine. To this end I provide a pivoted bell-crank or L-shaped lever, S, the broad end s of which bears, by the force of a spring acting on the lever, upon the periphery of the ratchet-wheels of said trip-disks. The opposite or short arm of said lever S is acted upon, as the end of the actuating movement is approached, by means of a pin, t, on the lever G, the action of said pin on said short arm of the lever forcing the locking end s of the lever firmly against the periphery of the ratchet-wheels of the trip-disks when the movement is completed, whereby said movement is limited, as the ratchet-wheels, and consequently the trip-disks, cannot be carried farther than the distance of one tooth or one notch, as will be obvious. As said ratchet-wheels are operated in the counting process, the lever yields to permit the passage of each tooth, as will be obvious, it being understood that the lever is only firmly locked against the ratchet-wheels at the completion of a counting movement.

I have shown in the drawings an eye-signal, T, which is connected with the actuating mechanism, and is brought down in front of the window, through which the indication of the trip-register is exposed at each operation of the machine, so as to attract attention and remain in sight until a complete movement has been effected; but this eye-signal has heretofore been patented by me, and is not claimed herein.

The several parts composing the zero gathering-plate, eye-signal, trip-register disks, indicator, &c., are preferably retained in place and braced by means of a front plate, W, which is secured at the front of the machine, just back of the face-plate, by suitable set-screws, whereby a steady organization is insured.

I have neglected to state that the figures or numerals of the zero or trip registering wheel Q are preferably arranged, as shown in Fig. 12, so that a trifle over a half-revolution brings an increase of one beneath the window in the back of the casing, through which the indications of said trip-registering wheel are exposed. The gearing between the gear-shaft P and the zero or trip registering wheel Q, the direction-indicator M, and the zero gathering-plate N is so proportioned that when the zero gathering-plate has made a complete rotation to reset the trip-register to zero the direction-indicator plate has made half a revolution to show a new indication, and the zero or trip registering wheel has made a trifle more than a half-revolution, so as to bring a new number and increase of one in its tally before its window, so that the trip-registering wheel registers the number of times the direction-indicator has been shifted and the trip-register reset.

I may remark, in conclusion, that so far as I am aware I am the first ever to have organized a trip-register with a zero-registering or trip-registering wheel—that is, a wheel which shows or registers the number of times of resetting the trip-register—with a pin on to operate the zero-registering wheel by engaging gear-teeth in its edge; and, furthermore, the first ever to have organized such parts in connection with mechanism for resetting the trip-register, and by the action of which—to wit, of a turning-shaft and connections thereof—not only is the trip-register reset, but the pinion operated and the zero-register wheel moved thereby, to show a new number of said wheel opposite its window in the register-casing to register the number of times the trip-register has been reset.

Without further elaboration of my improvements, what I claim herein as my invention is—

1. The combination, with a trip-register, its actuator, and a resetting mechanism for said register, of a notched or recessed direction-indicator, a gear-connection between said indicator and said resetting mechanism, and a locking mechanism adapted to lock the main actuator when the resetting operation is commenced, and release said actuator when the resetting operation is completed, substantially as described.

2. The combination, with a trip-register, its actuator, and a resetting mechanism for said register, of a direction-indicator, a gear-shaft connecting said resetting mechanism and said indicator, and a pivoted lever moved in one direction by said gear-shaft to lock the actuator of the machine and free the direction-indicator and trip-register, and in the other direction by a spring when said indicator and trip-register have been shifted and reset, respectively, to lock said indicator and register-resetting mechanism and release said actuator, substantially as described.

3. The combination of a trip-register, an actuator thereof, and resetting mechanism therefor, with a direction-indicator, locking mechanism which, when the trip-register is free to be reset, locks the actuator thereof, and a single knob or handle and connecting devices, whereby said locking mechanism is controlled and the indicator and trip-register shifted and reset, respectively, by a single operating mechanism, substantially as described.

4. The combination, with a trip-register, a resetting mechanism for said register, and a direction-indicator, of a gear-shaft connecting said resetting mechanism and indicator, and acting to simultaneously reset said register and shift said indicator, substantially as described.

5. The combination, with a trip-register, a resetting mechanism for said register, and a zero-register or trip-registering wheel, of a gear-shaft connecting said resetting mechanism and trip-registering wheel, substantially as described.

6. The combination, with a direction-indicator and a trip-registering wheel, of a gear-shaft connecting said indicator and said wheel, whereby the number of times the indicator is shifted is shown, substantially as described.

7. The combination, with a trip-register, a resetting mechanism for said register, a direction-indicator, and a trip-registering wheel, of a gear-shaft connecting said resetting mechanism, indicator, and trip-registering wheel, substantially as described.

8. The combination of a trip-register, the actuator of said register, a resetting mechanism for said register, a direction-indicator, a gear-shaft connecting said resetting mechanism and said indicator, so as to cause them to be movable together, a pivoted lever fitted at one end to engage locking recesses or notches in said indicator, and at the other side of its pivot with a locking connection to engage said actuator, and a cam or connection of said gear-shaft to disengage said lever from said indicator, to permit it to be shifted and the trip-register to be reset, and at the same time lock the actuator from the counting operation, substantially as described.

9. The combination and organization, in a registering-machine, of an inclosing-casing, a centrally-located trip-register, a general register mounted in the lower end of said casing, below said trip-register, a lever pivoted near one side of the casing and extending transversely across it above said trip-register, a push-arm connected to said lever at one side of the trip-register and extending downward to act upon the actuating ratchet-wheel of the general register to operate it step by step in the counting process, an endwise-movable handle or slide jointed to said lever at the side of the trip-register opposite to said push-arm and projecting at its lower end through a guide-slot in the lower end of said casing, to afford ready means for grasping the slide to operate it by a downward pull, and an operating pawl or connection, also connected with said slide to actuate the trip-register, substantially as described, whereby an effective operating connection is secured for both the trip and general registers, with a compact organization of the parts.

10. The combination, with a driving or operating ratchet-wheel of a registering mechanism, and with the inclosing-casing thereof, of a lever-arm having an angular or short bent end pivoted at the angle thereof within said casing, a push arm or pawl carried by the long end or portion of said lever-arm and acting upon said ratchet-wheel to operate it, a spring acting on the short angle end of said lever-arm to normally maintain said lever-arm in position to engage its operating arm or pawl with the teeth of the ratchet-wheel, and a handle to operate said lever-arm through its long arm extending outside the casing to be grasped by the operator, substantially as described.

11. The combination of a register-casing, a lever-arm having a short angular or bent end pivoted at the angle thereof within said casing at or near one side thereof, and said lever-arm extending transversely across the machine, a push arm or pawl pivoted to the long arm or portion of said lever-arm near said pivoted angle end thereof, a registering mechanism having an actuating ratchet-wheel to be acted upon and operated by said push arm or pawl, a spring acting on the short arm of the angle or bent end of said lever-arm to return said lever-arm to its normal position after an actuation thereof, and a reciprocating endwise-movable handle or slide to operate said lever-arm through its long arm, and extending downward through the bottom edge of the casing to be operated by a downward pull, substantially as described.

12. The combination, with the actuating ratchet-wheels of a trip and a general register, of a rocking lever-connection with the back plate of the register extending across the machine, operating-pawls for the trip and general registers carried by said lever-connection, an endwise-movable operating slide or handle jointed to said lever-connection at one side of the machine and movable up and down to vibrate said connection to operate the registers, a pivoted bell-hammer, also vibrated and tripped by said lever-connection, and a spring to return said lever-connection, operating-pawls, and handle to their normal position after the downward pull on the handle is released, substantially as described, whereby the registers are operated and the alarm sounded by means of a simple and effective operating connection, with a compact organization of the parts.

13. The combination, with a register-operating ratchet-wheel and a pivoted lever carrying a pawl to engage with and operate said ratchet-wheel, of a pivoted punch-operating lever connected with and operated by said pawl-carrying lever, and a straight reciprocating slide connected with said pawl-carrying lever by a link-connection to operate said lever, substantially as described.

14. The combination, with an actuating ratchet-wheel of a register and its actuator, of a pivoted lever and a spring acting thereon to keep one end of said lever in contact with said ratchet-wheel, said lever being fitted at the other end to be acted upon at the close of the counting movement by a projection on said actuator, substantially as described, whereby said lever is firmly held against said ratchet-wheel at the close of the counting operation to stop said wheel and prevent it from moving farther than it should go.

15. The combination, with a flat register disk or dial and its carrying or supporting device, of a detachable friction-ring, between which and a frame-plate the edge of the disk rotates, whereby friction is exerted on the edge of said disk to retard its motion, substantially as described.

16. The combination, with a register disk or dial and its carrying or supporting device, of a friction device fitted to act on said disk or dial, and a stop device acting on said carrying or supporting device of said disk, substantially as described, whereby the movement of the disk and its supporting device in the counting operation is limited by said stop device, and in addition friction is independently exerted upon the disk, whereby the connection between said disk and said carrying or supporting device is rendered durable.

17. The combination, with the trip-disks having projections thereon, of a zero gathering-plate having a pivoted arm to act on the projections of said disk, said arm forming a rigid connection with the trip-disks in the resetting operation, while yielding to permit the passage of the disks in the counting operation, substantially as described.

18. In combination with a trip-register operated step by step in the process of consecutive counting and capable of being reset to zero or the starting-point, a zero-register wheel having gear-teeth around its edge, and numerals or figures thereon, and a pinion-wheel mounted on an independent axis, and meshing with said teeth to move the zero-register wheel when the trip-register is reset, substantially as described.

19. The combination, with a trip-register having units and tens dials to show the count or tally thereof, of a resetting mechanism acting on pins or projections on the face of said dials to reset them, and a zero-register wheel having gear-teeth in its edge, which registers the number of resetting operations of said trip-register, said zero-register wheel being operated by means of a pinion-wheel operated when the resetting mechanism is operated, substantially as described.

20. In combination with a trip-register, a zero-register or trip-registering wheel having gear-teeth in its edge, a pinion to operate said zero-register wheel, a resetting mechanism to reset said trip-register, and an operating-connection between said resetting mechanism and said pinion, substantially as described, so that when the trip-register is reset the pinion-wheel is operated to change the indication of the zero-register or trip-indicator.

21. The combination, in a fare-register, of a trip-registering mechanism, a pivoted lever carrying a pawl to actuate said trip-register in the counting process, an endwise-movable slide or prime mover jointed to said lever and extending outward through the casing to operate said pawl-carrying lever, a pivoted or rocking catch or lever to lock the prime mover from operation when said catch is in one position, a resetting mechanism to reset the trip-register, and a connection between said locking catch or lever and said resetting mechanism, whereby when the resetting mechanism is operated to bring the trip-register to zero the actuator is locked from an actuating movement, while when the trip-register is reset to zero the locking catch or lever is moved out of locking contact with the actuator, as set forth.

22. In the organization of a fare-registering machine, the combination, with an inclosing-casing, of a substantially central post or axis, around which the trip-register supporting or carrying devices work, an alarm device mounted upon a post above said trip-register in the upper end of the casing, a permanent or general register mounted in the lower end of said casing below said trip-register devices, a lever-connection extending crosswise of the machine carrying operating pawls or connections to act upon the ratchet-wheels of the trip and general registers and to operate the alarm mechanism, to move said registers simultaneously in the counting process and sound the alarm, and a reciprocating or endwise-movable actuating slide or prime mover jointed to said lever-connection, and extending outside the casing to be operated by hand, substantially as described, whereby a highly-effective organization of the parts of a fare-register, particularly of the actuating-connections thereof, is attained, substantially as described.

In testimony whereof I have hereunto subscribed my name.

JOHN B. BENTON.

Witnesses:
EDWARD BEADLE,
WM. B. HICKS.